(No Model.)
D. M. FULTON.
NUT LOCK.
No. 524,895. Patented Aug. 21, 1894.
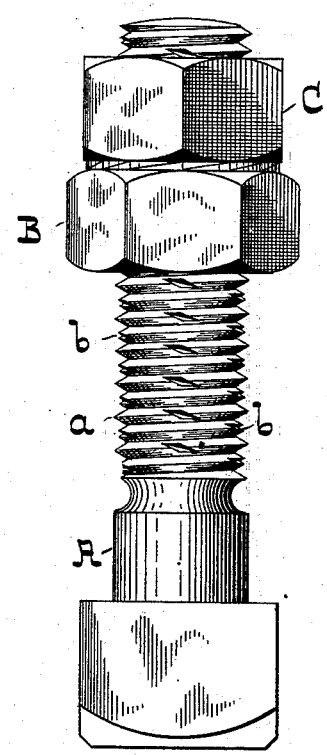
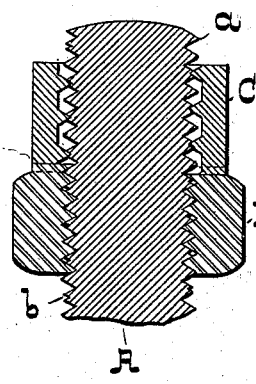
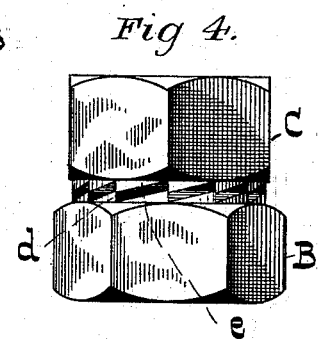
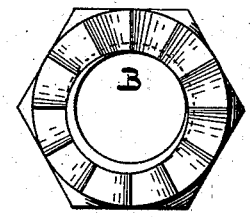
WITNESSES — Dan'l Fisher, George Hemsley
INVENTOR — David M. Fulton, by W. T. Howard, Atty.

UNITED STATES PATENT OFFICE.

DAVID M. FULTON, OF BALTIMORE, MARYLAND.

NUT-LOCK.

SPECIFICATION forming part of Letters Patent No. 524,895, dated August 21, 1894.

Application filed June 20, 1894. Serial No. 515,085. (No model.)

*To all whom it may concern:*

Be it known that I, DAVID M. FULTON, of the city of Baltimore and State of Maryland, have invented certain Improvements in Nut-Locks, of which the following is a specification.

In the description of the said invention which follows, reference is made to the accompanying drawings forming a part hereof, and in which—

Figure 1 is an exterior side view of a bolt and its holding and lock nuts constructed in accordance with my invention. Fig. 2 is a section of the upper part of Fig. 1. Fig. 3 is a top view of the lower nut. Fig. 4 is an exterior side view of the two nuts before the completion of the locking operation, as will hereinafter fully appear.

Referring to the drawings A is a bolt having a right hand thread $a$ cut in the usual manner. B is the holding nut having a thread corresponding with and adapted to fit the one $a$. Around the thread $a$ of the bolt A is cut a shallow angular spiral groove $b$ having a pitch much greater than that of the thread $a$. The depth of this groove is about one third to one-half of that of the thread $a$, consequently the said thread is not cut through or its strength materially reduced.

C is the locking nut having a thread constructed to fit the groove $b$ see Fig. 2.

The adjacent faces of the nuts B and C have radial teeth of a common size and shape. The shape of these teeth is shown particularly in Figs. 1, 3 and 4, and it will be seen that they have straight faces $d$ and $e$, the ones $d$ being practically parallel with the axis of the bolt and the others $e$ inclined. These teeth serve to lock the nuts when the same are brought together.

In the operation of the invention, the holding nut is screwed down tightly to its proper position onto the piece to be held, and then the locking nut C screwed on the bolt in a reverse direction until it comes in contact with the holding nut. The teeth of the two nuts when first brought into contact appear as shown in Fig. 4, and to fully lock the nuts the holding one B is slightly unscrewed or until the locking nut C is drawn down and its teeth fully engaged with those of the nut B. The teeth then appear as shown in Fig. 1.

The advantage in having the groove $b$ of a coarser pitch than that of the thread $a$, is that a very slight circumferential movement of the holding nut is required to lock it, the locking nut coming down more rapidly to meet it. In other words, in the locking operation the two nuts approach each other but with different speeds, and the holding nut moves outward only about one half the distance that the locking nut moves inward. By this means the slackening of the holding nut is hardly perceptible.

As before briefly stated, the spiral groove $b$ does not sever the thread $a$ but merely notches it, as shown in Fig. 1, and the integrity of the thread is not destroyed, or the effectiveness of the bolt impaired to any appreciable extent. Where the thread is entirely cut through, it forms short spirals and has little strengthening effect on the body of the bolt.

I claim as my invention—

A bolt having an ordinary holding thread, and holding nut with teeth on its upper surface, and a spiral groove of greater pitch and of less depth than the holding thread, combined with a locking nut having a thread adapted to fit in the spiral groove and provided with the surface teeth corresponding with those on the holding nut, substantially as specified.

DAVID M. FULTON.

Witnesses:
WM. T. HOWARD,
DANL. FISHER.